Feb. 1, 1966 E. GROEBER 3,232,305

FLUID LOGIC APPARATUS

Filed Nov. 14, 1963 2 Sheets-Sheet 1

INVENTOR.
EUGEN GROEBER
BY H P Terry
ATTORNEY

INVENTOR.
EUGEN GROEBER
BY H P Terry
ATTORNEY 3,232,305
Patented Feb. 1, 1966

3,232,305

FLUID LOGIC APPARATUS

Eugen Groeber, Salt Lake City, Utah, assignor to Sperry Rand Corporation, Great Neck, N.Y., a corporation of Delaware Filed Nov. 14, 1963, Ser. No. 323,724
8 Claims. (Cl. 137—81.5)

Figure 1:
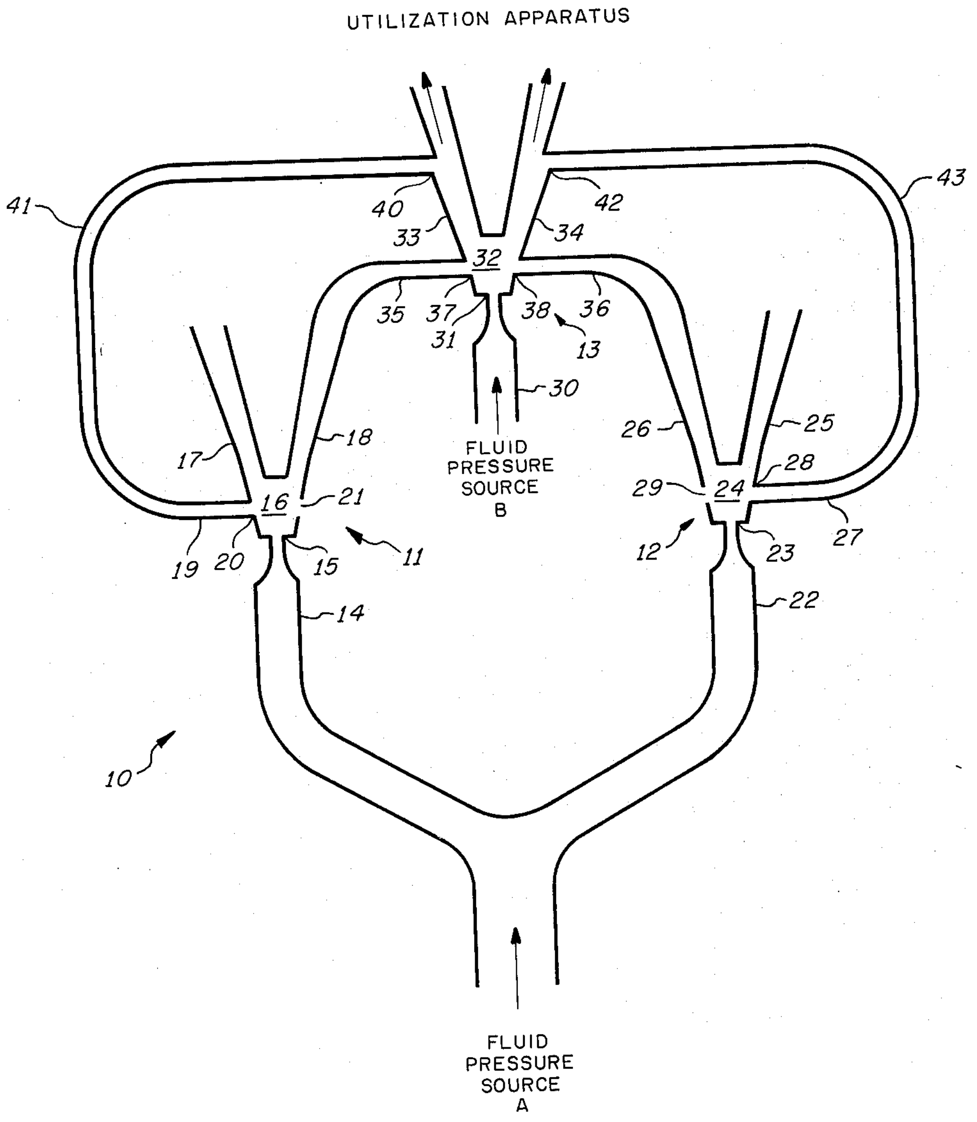

The present invention relates to fluid logic devices of the type utilizing a triggerable bistable element suitable for use in fluid digital computer systems.

The problem of making a digital counter, partial sum or partial difference of digital functions is simplified if a triggerable flip-flop is available. The present invention provides a pure fluid triggerable flip-flop suitable for this purpose. The fluid logic apparatus of the present invention may also be utilized as an oscillator.

Prior digital computers utilized logic elements that were either electrically or mechanically operated. The electronic elements suffered from the disadvantages of being relatively delicate, sensitive to environmental conditions and relatively expensive while the equivalent mechanical elements included moving parts having high inertia characteristics and consequent slow reaction time and they tended to be susceptible to malfunctions.

It is therefore a primary object of the present invention to provide fluid logic apparatus for controlling fluid flow without utilizing moving parts.

It is a further object of the present invention to provide fluid logic apparatus which produces a logic function that is relatively insensitive to environmental conditions and is extremely reliable.

It is another object of the present invention to provide a simple pure fluid logic apparatus of the triggerable flip-flop type.

The above objects are achieved by pure fluid apparatus utilizing a bistable fluid logic element in conjunction with at least two monostable fluid logic elements. The bistable element is sequentially switched as a function of its condition as related to the inputs provided to the monostable elements. Switching times as well as the particular application for which the combination is to be utilized may be made a function of the characteristics of the number and type of the monostable elements.

Figure 2:
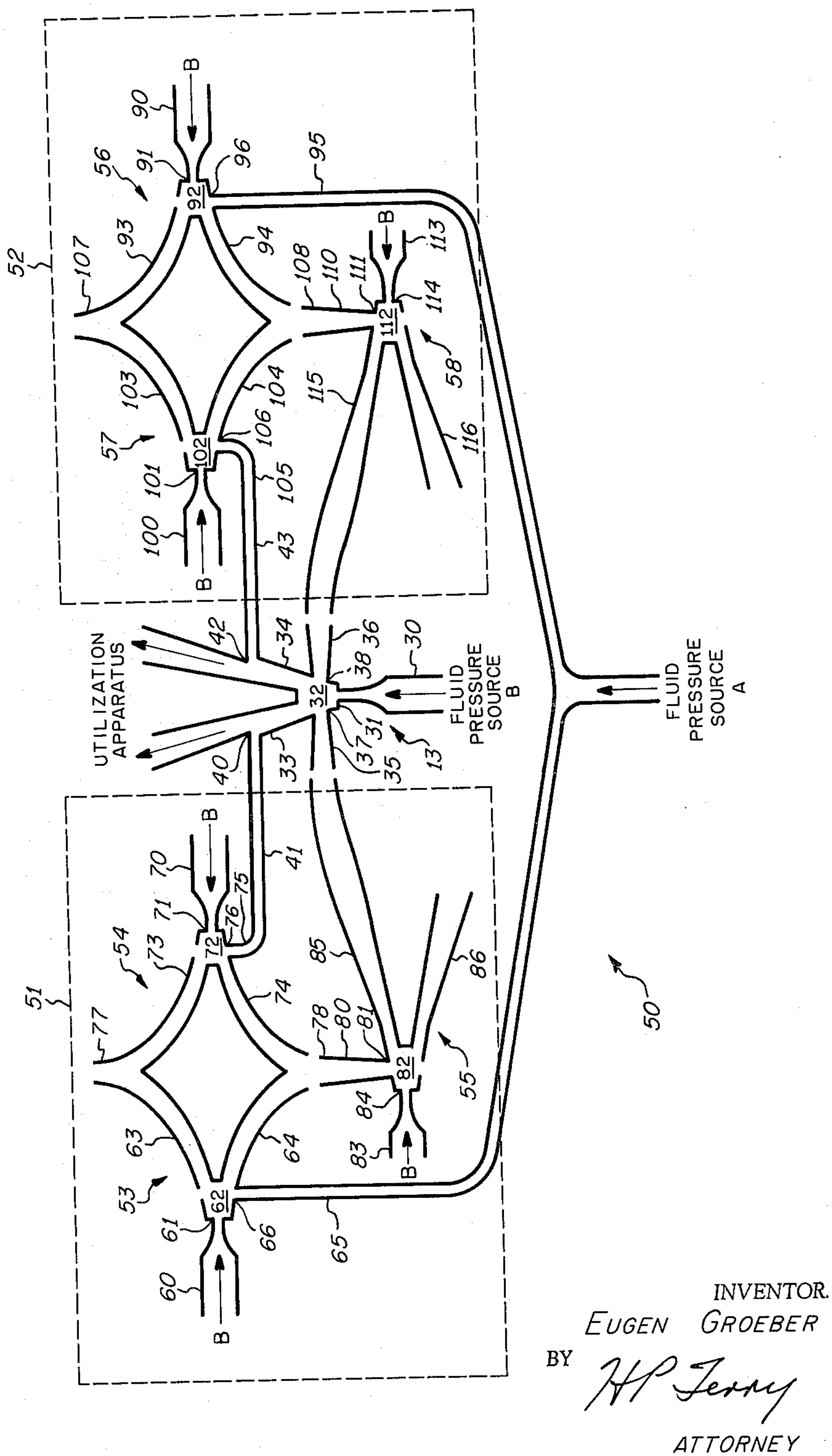

These and other objects of the present invention will become apparent by referring to the drawings in which:

FIG. 1 is a schematic diagram of a three element pure fluid logic triggerable flip-flop device; and FIG. 2 is a schematic diagram of a seven element pure fluid logic triggerable flip-flop device.

Referring to FIG. 1, the pure fluid logic device 10 includes a pair of monostable NOT elements 11 and 12 interconnected with respect to a bistable element 13. The elements 11, 12 and 13, may, for example, be made from a plurality of flat plates as disclosed in U.S. Patent Numbers 3,001,698 and 3,030,979 although other constructions in the art are suitable for practicing the present invention. In said patents, the desired channel configuration is cut, etched, stamped, or otherwise formed in one of the plates. Since this construction is well known in the art, the drawing shows only the channel configurations which define the paths of fluid flow for the present invention. It will be appreciated that the term "channel" as used herein refers to conduits, pipes, tubes, closed ducts, or other closed passageways for conveying fluid, and the term "orifice" includes restricted or unrestricted openings.

The monostable element 11 has a power stream input channel 14 terminating at an orifice 15 in the downstream wall of a chamber 16 formed by the intersection of first and second diverging output channels 17 and 18. The element 11 also includes a feedback control stream input channel 19 which terminates in the orifice 20 to provide a feedback control stream emanating from the orifice 20 that is cooperative with the power stream emanating from the orifice 15 for deflecting the power stream to flow through the output channel 18 in lieu of the output channel 17. The power stream emanating from the orifice 15 normally tends to flow through the output channel 17 because of the well known Coanda effect which provides a stable dynamically formed and sustained pressure gradient across the power stream within the chamber 16 which keeps the power stream affixed to the wall associated with the output channel 17 and because of the vent 21 in the wall associated with the output channel 18 in a manner more fully disclosed in U.S. patent application S.N. 306,484 entitled, "Fluid Logic Device," of Groeber and Thorne, Sr., filed September 4, 1963.

Similarly, the monostable element 12 includes a power stream input channel 22 terminating at an orifice 23 in the downstream wall of a chamber 24 formed by the intersection of first and second diverging output channels 25 and 26. The element 12 also includes a feedback control stream input channel 27 which terminates in the orifice 28 to provide a feedback control stream emanating from the orifice 28 that is cooperative with the power stream emanting from the orifice 23 for deflecting power stream to flow through the output channel 26 in lieu of the output channel 25. The power stream emanating from the orifice 23 normally tends to flow through the output channel 25, as explained with respect to the element 11 because of the Coanda effect and the vent 29.

A pulsed or continuous fluid pressure source A is connected to the power stream input channels 14 and 22 to provide pulsed or continuous power streams from the orifices 15 and 23, respectively, in a manner to be more fully explained.

The bistable fluid logic element 13 includes a power stream input channel 30 terminating at an orifice 31 in the downstream wall of a chamber 32 formed by the intersection of first and second diverging output channels 33 and 34. The other end of the power stream input channel 30 is connected to a continuous power stream fluid pressure source B which provides a continuous fluid flow that emanates as a power stream from the orifice 31. The element 13 further includes first and second control stream input channels 35 and 36 which terminate in orifices 37 and 38, respectively, in opposite walls of the chamber 32. The orifices 37 and 38 define respective paths of control stream fluid flow that are opposed with respect to each other and cooperative with the power stream from the orifice 31. The output channels 33 and 34 are arranged symmetrically with respect to the power stream from the orifice 31 in order that in the absence of any control stream from either of the orifices 37 or 38, the power stream arbitrarily flows through one of the output channels 33 or 34 and is not arranged to flow through any particular one of them.

The element 13 includes a flow divider 40 in its output channel 33 in order that a portion of the fluid flowing through the output channel 33 is diverted through the divider 40 which is connected by a feedback channel 41 to the control stream input channel 19 of the element 11. Similarly, a portion of the flow through the output channel 34 is diverted through a flow divider 42 which is connected by a feedback channel 43 to the control stream input channel 27 of the element 12. The output channels 33 and 34 of element 13 have extensions downstream from the respective flow dividers 40 and 42 that are connected to utilization apparatus as indicated by the legend.

In operation, with the apparatus 10 utilized as a trgigerable flip-flop or binary counter, the fluid pressure source A provides a source of fluid pulses while the fluid pressure source B provides a continuous flow of power stream fluid through the orifice 31, the fluid from the orifice 31 will flow out arbitrarily through either one of the output channels 33 or 34 during the initial operation. Once the power stream attaches to a wall, the Coanda effect maintains the power stream affixed to that wall in the absence of any control stream flow in the element 13. Assuming that the power stream is flowing through the output channel 33, a small fraction of the fluid is diverted through the feedback duct 41 by the flow divider 40 while the remainder flows out the extension of the output channel 33. The flow through the feedback channel 41 is directed through the orifice 20 of the element 11 into the interaction region of the chamber 16 by means of the control stream input channel 19. In the absence of a fluid pulse from the source A, the feedback flow is insufficient to cause the power stream from the orifice 31 to switch.

Upon the arrival of a fluid pulse from the source A, a power stream resulting from the fluid pulse issues from each of the orifices 15 and 23. In the monostable element 12, due to the absence of a feedback control stream from the orifice 28, the power stream from the orifice 23 flows through its normal output channel 25. In the monostable element 11, the feedback control stream from the orifice 20 causes the power stream from the orifice 15 to be deflected from the output channel 17 to flow through the output channel 18 and thence into the control signal input channel 35 where it emanates from the orifice 27 as a control stream. The control stream from the orifice 27 deflects the power stream emanating from the orifice 31 from the output channel 33 to flow through the output channel 34.

The power stream from the orifice 31 will continue to flow through the output channel 34 although a portion thereof is diverted through the flow divider 42 and emanates from the orifice 28 as a control stream because by this time the pulse from the fluid pressure source A is dissipated and there is insufficient flow from the orifice 38 to cause the power stream from the orifice 31 to switch back to the output channel 33. However, with the advent of the next pulse from the fluid pressure source A, the pulse power stream emanating from the orifice 23 is now deflected by the feedback control stream from the orifice 28 to flow through the output channel 26 and thence function as a control stream from the orifice 38 which causes the power stream from the orifice 31 to switch from the output channel 34 to the output channel 33 thereby completing a full sequence of operations. Subsequent pulses from the fluid pressure source A will switch the output of the element 13 sequentially in the manner explained above.

When it is desired to utilize the device 10 as an oscillator, the fluid pressure source A provides a continuous source of power fluid. In this embodiment the power streams emanating continuously from the orifices 15 and 23 of the elements 11 and 12, respectively, and the feedback control streams emanating from the orifices 20 and 28 causes the power stream of the bistable element 13 to sequentially switch from the output channel 33 to the output channel 34 and back again. Thus, an oscillator can be designed to have a switching rate which is a function of the switching characteristics of the elements 11, 12 and 13 and the feedback fluid flow characteristics.

Referring to FIG. 2, to provide greater flexibility and/or time delay variations, a triggerable flip-flop may be provided by the device 50 which utilizes seven fluid logic elements in which like reference characters indicate like elements with respect to FIG. 1. The triggerable flip-flop apparatus 50 includes a bistable pure fluid logic element 13 interconnected with two AND subassemblies 51 and 52. The AND fluid logic devices 51 and 52 are more fully disclosed in said U.S. application S.N. 306,484, and each comprise three interconnected monostable NOT fluid logic elements generally of the type disclosed in FIG. 1 as elements 11 and 12. The AND fluid logic device 51 includes three monostable fluid logic elements 53, 54 and 55, and similarly the AND fluid logic device 52 includes three monostable fluid logic elements 56, 57 and 58.

The monostable element 53 has a power stream input channel 60 terminating in an orifice 61 in a chamber 62 formed by the intersection of first and second diverging output channels 63 and 64. The element 53 also includes a control stream channel 65 terminating in an orifice 66 in the chamber 62 which defines a control stream that is cooperative with the power stream emanating from the orifice 61. The other end of the control stream channel 65 is connected to the fluid pressure source A as indicated by the legend.

Similarly, the monostable element 54 has a power stream input channel 70 terminating in an orifice 71 in a chamber 72 formed by the diverging output channels 73 and 74. The element 54 further includes a control stream input channel 75 which terminates in an orifice 76 and has its other end connected to the feedback channel 41 of the bistable element 13. The diverging output channels 63 and 64 of the element 53 and the diverging output channels 73 and 74 of the element 54 are so arranged that the output channels 63 and 73 gradually turn and asymptotically merge into a first common output channel 77. Similarly, the output channels 64 and 74 merge into a common output channel 78 which is connected to the control stream input channel 80 of the element 55 to terminate in an orifice 81 in a chamber 82 of the element 55. The element 55 further includes a power stream input channel 83 that terminates in an orifice 84 in the chamber 82 which is formed by the intersection of diverging output channels 85 and 86. The output channel 85 is connected to the control stream input channel 35 of the bistable element 13.

In a similar manner the monostable element 56 has a power stream input channel 90 terminating in an orifice 91 in a chamber 92 formed by the intersection of first and second diverging ouput channels 93 and 94. The element 56 also includes a control stream channel 95 terminating in an orifice 96 in the chamber 92 which defines a control stream that is cooperative with the power stream emanating from the orifice 91. The other end of the control stream input channel 95 is connected to the fluid pressure source A.

Similarly, the monostable element 57 has a power stream input channel 100 terminating in an orifice 101 in a chamber 102 formed by the diverging output channels 103 and 104. The element 57 further includes a control stream input channel 105 which terminates in an orifice 106 and has its other end connected to the feedback channel 43 of the bistable element 13. The diverging output channels 93 and 94 of the element 56 and the diverging output channels 103 and 104 of the element 57 are so arranged that the output channels 93 and 103 gradually turn and asymptotically merge into a first common output channel 107. Similarly, the output channels 94 and 104 merge into a common output channel 108 which is connected to the control stream input channel 110 of the element 58 to terminate in an orifice 111 in a chamber 112 of the element 58. The element 58 further includes a power stream input channel 113 that terminates in an orifice 114 in the chamber 112 which is formed by the intersection of diverging output channels 115 and 116. The output channel 115 is connected to the control stream input channel 36 of the bistable element 13.

The monostable elements 53 to 58 are arranged in order that the power stream of each favors one outlet channel normally and can be flipped or switched temporarily by a control stream but the power stream flips back immediately to its preferred condition when the control stream ceases in a manner more fully described in said U.S application S.N. 306,484. In the elements 53 to 58 the power stream favors the output channel opposite to the one which is vented to the ambient pressure by means of openings shown as discontinuities in the respective chambers or by any of the other means disclosed in said U.S. application S.N. 306,484. Further to prevent undesirable pressure feedback the interconnections between the elements may be interrupted or vented to the ambient pressure as indicated by discontinuities in the output channels or by any other suitable means of transmitting the energy of the air flow solely by kinetic energy, for example, as shown in U.S. patent application S.N. 274,741 of Peter Bauer entitled, "Improvements in Fluid Amplifiers." Each of the power stream input channels of the elements 53 to 58 are connected to a source of continuous fluid pressure such as source B as indicated by the respective legends.

In operation, when it is desired to utilize the device 50 as a binary counter or triggerable flip-flop, the fluid pressure source A provides a source of fluid pulses while the fluid pressure source B provides a continuous flow of fluid.

With the fluid pressure source B providing a continuous flow of power stream fluid through the orifice 31, the fluid will flow out arbitrarily through either one of the output channels 33 or 34 during the initial operation. Once the power stream attaches to a wall, the Coanda effect within the chamber 32 keeps the power stream affixed to that wall in the absence of any control stream flow from the orifices 37 or 38. Assuming that the fluid is flowing through the output channel 33, a small fraction is diverted into the feedback duct 41 by the flow divider 40 while the remainder flows out of the extension of the output channel 33. The flow through the feedback duct 41 emanates from the orifice 76 as a control stream which causes an upward deflection of the power stream from the orifice 71 causing the power stream to be deflected from its normal output channel 74 to the output channel 73. However, in the absence of a pulse from the fluid pressure source A, the power stream from the orifice 61 continues to flow through its normal output channel 64 and emanantes from the orifice 81 as a control stream which deflects the power stream from the orifice 84 from its normal output channel 85 to flow through the output channel 86 resulting in the absence of a control stream from the orifice 37. Thus the power stream from the orifice 31 continues to flow through the output channel 33. There is no control stream from the orifice 38 since there is no appreciable fluid flowing through the feedback channel 43 nor is there any pulse from the fluid pressure source A, both of which are required to provide a control stream at the orifice 38.

With the arrival of a fluid pulse from the source A, a control stream resulting therefrom issues from the orifice 66 and causes deflection of the power stream from the orifice 61 to cause it to flow through the output channel 63. Since both power streams from the orifices 61 and 71 now flow through their respective output channels 63 and 73, there is no control stream from the orifice 81 and the power stream from the orifice 84 flips to its normal monostable condition to flow through the output channel 85 to provide a control stream from the orifice 37. The control stream from the orifice 37 deflects the power stream from the orifice 31 to cause fluid flow through the output channel 34. There is no control stream from the orifice 38 prior to the time the power stream from the orifice 31 flows through the output channel 34 because the power stream from the orifice 101 acting through the orifice 111 continues to deflect the power stream from the orifice 114 to flow through the output channel 116.

By the time the power stream from the orifice 31 switches to flow through the output channel 34, the fluid pulse from the source A is dissipated and therefore the power stream from the orifice 91 now flows through the output channel 94 and provides a control stream from the orifice 111 which deflects the power stream from the orifice 114 so that it continues to flow through the output channel 116. With the power stream from the orifice 31 flowing through the output channel 34, the flow divider 42 causes a portion of the fluid to flow through the feedback channel 43 and is issued from the orifice 106 as a control stream which deflects the power stream from the orifice 101 to flow through the output channel 103. However, the power stream from the orifice 31 continues to flow through the output channel 34 of the bistable element 13 because the power stream from the orifice 91 continues to act as a control stream through the orifice 111 which results in the absence of a control stream from the orifice 38. During this time the power streams from the orifices 61 and 71 flow through the output channels 64 and 74 respectively, thereby deflecting the power stream from the orifice 84 to flow through the output channel 86 resulting in the absence of a control stream from the orifice 37. Thus the bistable element 13 remains in its present condition until the arrival of the next pulse.

With the arrival of the next pulse, the combination of the feedback flow through the feedback channel 43 and the fluid pulse emanating from the orifice 96 as a control stream causes the power streams from the orifices 101 and 91 to flow through their respective output channels 103 and 93 thereby permitting the power stream from the orifice 114 of the monostable element 58 to revert to its normal position and flow through the output channel 115 to provide a control stream from the orifice 38. The control stream from the orifice 38 flips the power stream from the orifice 31 to cause it to flow through the output channel 33 to provide a complete sequence of operation. Subsequent fluid pulse will sequentially switch the element 13 in a manner explained above.

When it is desired to utilize the device 50 as an oscillator, the fluid pressure source A provides a continuous source of power fluid. In this embodiment, the power streams emanating continuously from the orifices 66 and 96 of the elements 53 and 56, respectively, in combination with the sequential feedback flow through the feedback channels 41 and 43 causes the power stream of the bistable element 13 to sequentially switch from one of its output channels to the other and back again. Thus, an oscillator can be designed to have a switching rate which is a function of the switching and feedback characteristics of the combined elements.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A pure fluid logic device comprising, (a) a bistable pure fluid logic element having a power stream input channel for defining a power stream, first and second control stream input channels for defining first and second control streams respectively cooperative with said power stream, first and second output channels each defining a path of fluid flow, and a chamber formed by the intersection of said input and output channels whereby said power stream may flow through either of said output channels in the absence of a control stream, (b) first and second monostable pure fluid logic elements each having a power stream input channel for defining a power stream, a control stream channel for defining a control stream cooperative with said monostable element power stream, first and second output channels each defining a path of fluid flow, and a chamber formed by the intersection of said monostable element input and output channels whereby said monostable element power stream normally tends to flow through said monostable element first output channel in the absence of a control stream while in the presence of a control stream it tends to flow through said monostable element second output channel, (c) each of said monostable element second output channels being coupled to respective ones of said bistable element control stream input channels, (d) first and second feedback channels coupled from said bistable element first and second output channels to said monostable element control stream channels respectively, (e) a first fluid pressure source connected to said bistable element power stream input channel, and (f) a second fluid pressure source connected to said monostable element power stream input channel.

2. A pure fluid logic device of the character described in claim 1 in which said first and second fluid pressure sources both provide continuous fluid flow.

3. A pure fluid logic device of the character described in claim 1 in which said first fluid pressure source provides a continuous fluid flow and said second fluid pressure source provides a pulsed fluid flow.

4. A pure fluid logic device comprising, (a) a bistable pure fluid logic element having a power stream input channel for defining a power stream, first and second control stream input channels for defining first and second control streams respectively cooperative with said power stream, first and second output channels each defining a path of fluid flow, and a chamber formed by the intersection of said input and output channels whereby said power stream may flow through either of said output channels in the absence of a control stream, (b) a plurality of monostable pure fluid logic elements each having a power stream input channel for defining a power stream, a control stream channel for defining a control stream cooperative with said monostable element power stream, first and second output channels each defining a path of fluid flow, and a chamber formed by the intersection of said monostable element input and output channels whereby said monostable element power stream normally tends of flow through said monostable element first output channel in the absence of a control stream while in the presence of a control stream it tends to flow through said monostable element second output channel, (c) a first portion of said plurality of monostable elements being arranged to form a first AND fluid logic device, (d) a second portion of said plurality of monostable elements being arranged to form a second AND fluid logic device, (e) first and second feedback channels coupled from said bistable element first and second output channels to said first and second AND devices respectively, (f) a first fluid pressure source connected to said bistable element power stream input channel, (g) a second fluid pressure source connected to said first and second AND devices, and (h) said first and second AND devices being connected to said bistable element first and second control stream input channels respectively whereby said AND devices provide an output signal to said bistable element when fluid signals occur simultaneously from said second fluid pressure source and said feedback channel.

5. A pure fluid logic device of the character described in claim 4 in which said first and second fluid pressure sources provide continuous fluid flow.

6. A pure fluid logic device of the character described in claim 4 in which said first fluid pressure source provides a continuous fluid flow and said second fluid pressure source provides a pulsed fluid flow.

7. A pure fluid logic device comprising, (a) a bistable pure fluid logic element having a power stream input channel for defining a power stream, first and second control stream input channels for defining first and second control streams respectively cooperative with said power stream, first and second output channels each defining a path of fluid flow, and a chamber formed by the intersection of said input and output channels whereby said power stream may flow through either of said output channels in the absence of a control stream, (b) first, second, third, fourth, fifth and sixth monostable pure fluid logic elements each having a power stream input channel for defining a power stream, a control stream channel for defining a control stream cooperative with said monostable element power stream, first and second output channels each defining a path of fluid flow, and a chamber formed by the intersection of said monostable element input and output channels whereby said monostable element power stream normally tends to flow through said monostable element first output channel in the absence of a control stream while in the presence of a control stream it tends to flow through said monostable element second output channels, (c) said first, second and third monostable elements being interconnected to form a first AND fluid logic device, (d) said fourth, fifth and sixth monostable elements being interconnected to form a second AND fluid logic device, (e) a first fluid pressure source connected to said bistable element power stream input channel, (f) a second fluid pressure source connected to one input of said first and second AND devices, (g) first and second feedback channels connected from said bistable element first and second output channels to second inputs respectively of said first and second AND devices whereby outputs are provided when fluid signals appear simultaneously at said first and second inputs of an AND device, and (h) said first and second AND devices having their outputs connected to said bistable element first and second control stream channels respectively.

8. A pure fluid logic device comprising, (a) a bistable pure fluid logic element having a power stream input channel for defining a power stream, first and second control stream input channels for defining first and second control streams respectively cooperative with said power stream, first and second output channels each defining a path of fluid flow, and a chamber formed by the intersection of said input and output channels whereby said power stream may flow through either of said output channels in the absence of a control stream, (b) six monostable pure fluid logic elements each having a power stream input channel for defining a power stream, a control stream channel for defining a control stream cooperative with said monostable element power stream, first and second output channels defining first and second paths of fluid flow respectively, and a chamber formed by the intersection of said monostable element input and output channels whereby said monostable element power stream normally tends to flow through said monostable element first output channel in the absence of a control stream while in the presence of a control stream it tends to flow through said monostable element second output channel, (c) said first output channels of a first pair of said monostable elements being connected to provide a first common output channel connected to said control stream input channel of another monostable element to form a first AND logic device, (d) said first output channels of a second pair of said monostable elements being connected to provide a second common output channel connected to said control stream input channel of the remaining monostable element to form a second AND device, (e) said second output channels of said another monostable element and said remaining monostable element being connected to said bistable element first and second control stream input channels respectively, (f) first and second feedback channels connected from said bistable element first and second output channels to respective control stream input channels of one of said first and second pair of said monostable elements, (g) a first fluid pressure source connected to said bistable element power stream input channel, and (h) a second fluid pressure source connected to the other control stream channel of said first and second pair of said monostable elements whereby outputs are provided from said first and second AND devices when fluid signals appear simultaneously from said feedback channels and said second fluid pressure source.

References Cited by the Examiner

UNITED STATES PATENTS

| | | | |
|---|---|---|---|
| 3,107,850 | 10/1963 | Warren et al. ---- | 137—81.5 X |
| 3,117,593 | 1/1964 | Sowers ---------- | 137—81.5 X |
| 3,128,040 | 4/1964 | Norwood -------- | 137—81.5 X |

FOREIGN PATENTS

| | | |
|---|---|---|
| 1,278,781 | 11/1961 | France. |

M. CARY NELSON, *Primary Examiner.*